United States Patent
Goertz et al.

(10) Patent No.: US 8,892,075 B2
(45) Date of Patent: Nov. 18, 2014

(54) SELECTIVE GENERATION OF CONVERSATIONS FROM INDIVIDUALLY RECORDED COMMUNICATIONS

(71) Applicant: Cisco Technology, Inc., San Jose, CA (US)

(72) Inventors: Michael Goertz, Cupertino, CA (US); Jeff Achtzehn, Gilroy, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/091,569

(22) Filed: Nov. 27, 2013

(65) Prior Publication Data
US 2014/0087698 A1     Mar. 27, 2014

Related U.S. Application Data

(63) Continuation of application No. 13/408,594, filed on Feb. 29, 2012, now Pat. No. 8,626,126.

(51) Int. Cl.
| | |
|---|---|
| *H04M 1/725* | (2006.01) |
| *H04M 3/56* | (2006.01) |
| *H04W 4/16* | (2009.01) |
| *H04M 3/42* | (2006.01) |
| *H04W 4/18* | (2009.01) |
| *H04W 4/20* | (2009.01) |

(52) U.S. Cl.
CPC ............ *H04M 3/42221* (2013.01); *H04M 3/56* (2013.01); *H04W 4/16* (2013.01); *H04W 4/206* (2013.01); *H04W 4/18* (2013.01)
USPC ...................................................... 455/412.1

(58) Field of Classification Search
USPC ........................................................ 455/412.1
See application file for complete search history.

(56) References Cited

U.S. PATENT DOCUMENTS

| | | | |
|---|---|---|---|
| 4,868,867 A | 9/1989 | Davidson et al. | |
| 6,029,063 A | 2/2000 | Parvulescu et al. | |
| 6,643,621 B1 | 11/2003 | Dodrill et al. | |
| 7,013,267 B1 | 3/2006 | Huart et al. | |
| 7,970,875 B1 | 6/2011 | Shaffer et al. | |
| 2004/0121790 A1 * | 6/2004 | Wolff et al. | 455/518 |

* cited by examiner

*Primary Examiner* — Joel Ajayi
(74) *Attorney, Agent, or Firm* — Cindy Kaplan

(57) ABSTRACT

In one embodiment, a method includes recording a communication at a mobile device, wherein the recorded communication is a user's portion of a conversation between the user and at least one other participant, transmitting the recorded communication to a network device, transmitting a request for the conversation to the network device, and receiving the conversation generated from the recorded communication and at least one other recorded communication from the other participant. An apparatus is also disclosed.

20 Claims, 5 Drawing Sheets

US 8,892,075 B2

SELECTIVE GENERATION OF CONVERSATIONS FROM INDIVIDUALLY RECORDED COMMUNICATIONS

RELATED APPLICATION

This patent application is a continuation of U.S. patent application Ser. No. 13/408,594, filed Feb. 29, 2012, which is incorporated herein by reference in its entirety.

TECHNICAL FIELD

The present disclosure relates generally to communication systems, and more particularly, to selective generation of conversations from individually recorded communications.

BACKGROUND

Mobile devices are increasingly used as primary communication devices for many users. There may be times when a user cannot recall parts of a conversation previously had using the mobile device and would like to review the conversation. The user may not have thought to record the conversation at the time, and even if the user had the foresight to record the conversation, recording a conversation between multiple parties may interfere with other people's privacy rights.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
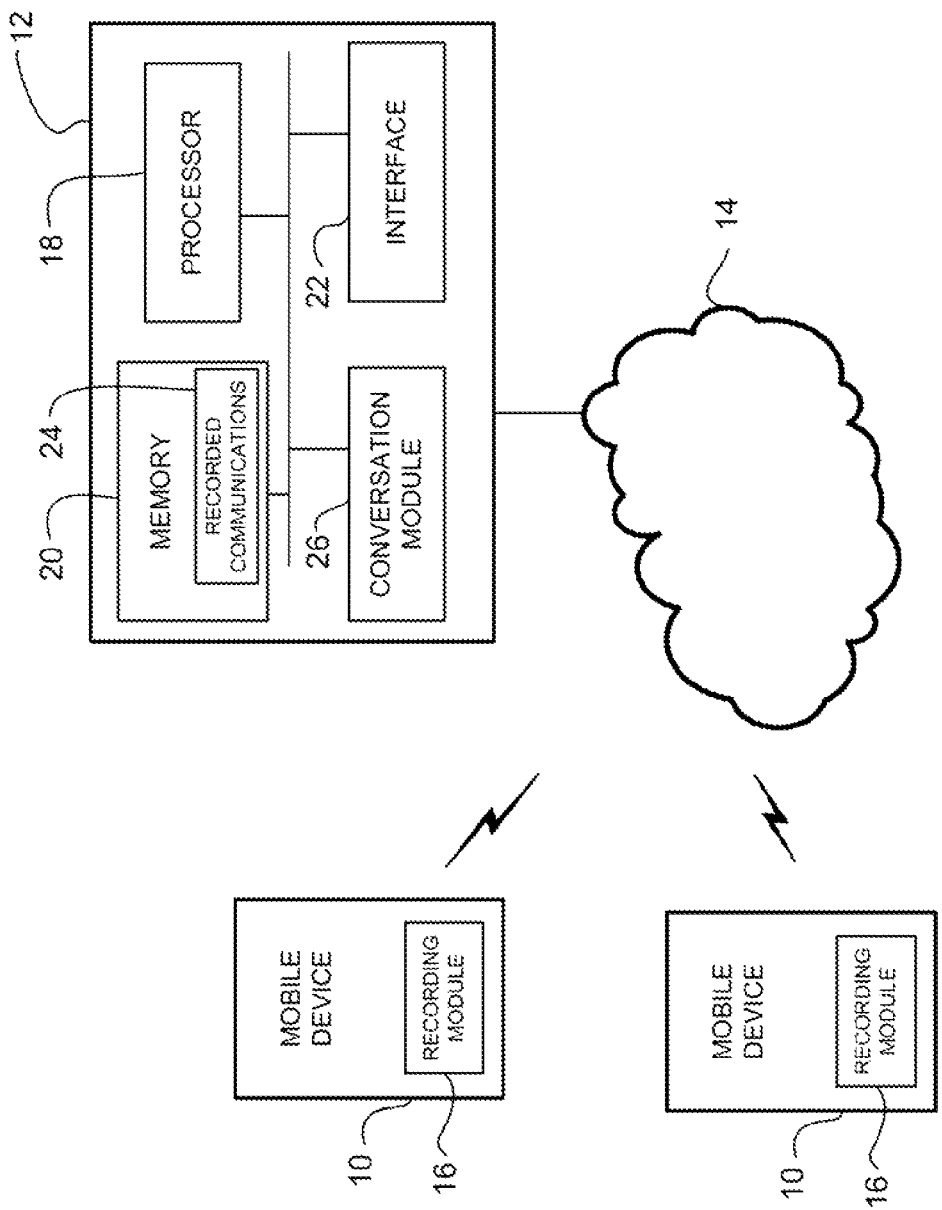
FIG. 1 illustrates an example of a network in which embodiments described herein may be implemented.

In one embodiment, a method generally comprises recording a communication at a mobile device, wherein the recorded communication comprises the user's portion of a conversation between the user and at least one other participant, transmitting the recorded communication to a network device, transmitting a request for the conversation to the network device, and receiving the conversation generated from the recorded communication and at least one other recorded communication from the other participant.

In another embodiment, a method generally comprises receiving and storing a plurality of recorded communications at a network device, each of the recorded communications representing a participant's portion of a conversation between at least two participants, receiving a request for the conversation, generating the conversation from the recorded communications at a network device, and transmitting the generated conversation.

In yet another embodiment, an apparatus generally comprises memory for storing a plurality of recorded communications, each of the recorded communications representing a participant's portion of a conversation between at least two participants, and a processor for receiving a request for the conversation, generating the conversation from the recorded communications, and transmitting the generated conversation.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein may be used to selectively generate a recreation of a multiparty conversation from individually recorded communications without having to know in advance that the conversation should be recorded. In one embodiment, each participant's portion of the conversation is recorded and transmitted to a central storage device. As described below, each participant's portion of the conversation may be included in the generated recording of the conversation, if the user requesting the conversation and participants belong to a common group that allows others within their group to use their recorded communications.

The term 'communication' as used herein refers to a user's or participant's portion of a conversation. The term 'conversation' as used herein refers to a multiparty conversation and may be an original conversation taking place between participants in which two or more of the participants' portions of the conversation are recorded (recorded communication) or a generated conversation, which is a recreation of the original conversation from the recorded communications. The generated conversation may be audio, video (i.e., video including text), or both audio and video.

The communication is recorded at a mobile device and includes audio only for the mobile device user's portion of the conversation. The conversation may take place over the mobile device (e.g., user talking to another participant over a cellular phone connection), may be live (e.g., with one or more participants in same room with user), or a combination of both. If participants other than the user are present and their voices can be picked up by the mobile device, the mobile device is preferably configured to filter out the other participants' voices so that only the user's portion of the conversation is recorded. This may be accomplished, for example, by the use of a microphone or headset worn by the user. The other participant's portion of the conversation may be recorded on their mobile device.

Referring now to the drawings, and first to FIG. 1, an example of a network in which embodiments described herein may be implemented is shown. For simplification, only a small number of nodes are shown in a communication system. The communication system includes mobile devices 10 in communication with a network device 12 over a network 14.

The network 14 may include one or more networks (e.g., local area network, wireless local area network, cellular network, metropolitan area network, wide area network, satellite network, Internet, intranet, radio access network, public switched network, virtual private network, or any other network or combination thereof). Communication paths between the mobile devices 10 and network device 12 may include any number or type of intermediate nodes (e.g., routers, switches, gateways, base stations, access points, or other network devices), which facilitate passage of data between the devices.

The mobile device 10 may be any suitable equipment that supports wireless communication, including for example, a cellular phone, personal digital assistant, portable computing device, tablet, multimedia device, and the like. The mobile device 10 may be in communication with a base station (not shown), which connects to a wired data network and serves as a gateway or access point through which the mobile device 10 has access to the network 14. The mobile device 10 and base station each include one or more antenna for wireless communication (e.g., 3G/4G (third generation/fourth generation of cellular wireless standards) wide area network (WAN) connection). The mobile device 10 may also comprise a Wi-Fi interface and communicate with the network 14 via an access point (not shown), rather than the base station.

The mobile device 10 includes a recording module 16 (e.g., software, application, code, program, device) used to record an audio communication at the mobile device 10. The recording module 16 may be configured, for example, to record only the user's portion of a conversation, along with the time and date of the conversation. The audio communications recorded at mobile device 10 are uploaded to network storage (e.g., memory 20) at network device 12. The mobile device 10 is preferably configured to compress the audio before transmitting the audio to the network device 12. The audio may be encrypted, compressed, or encoded according to any format. The network device 12 may also be configured to decompress or decrypt audio received from the mobile device 10 and compress or encrypt audio or video transmitted to the mobile device. Details of one example of the mobile device 10 are described below with respect to FIG. 2.

The network device 12 may be any device (e.g., server, host) or group of devices configured to receive, process, and store recorded audio communications from the mobile devices 10. The network device 12 is a programmable machine that may be implemented in hardware, software, or any combination thereof. The network device 12 includes one or more processor 18, memory 20, and network interface 22. Memory 20 may be a volatile memory or non-volatile storage, which stores various applications, operating systems, modules, and data for execution and use by the processor 18. Recorded communications 24 may be stored in memory 20. Memory 20 may also store trust groups or a list of recorded communications or available conversations identified by date/time, participants, or keywords, for example.

The recorded communications 24 are stored at network storage at the network device (e.g., memory 20) or remotely located network storage. The network storage may be configured to provide a first-in-first-out buffer of a specified duration (e.g., day, week, month) and may also be configured to prioritize conversations. For example, the user may identify an important conversation or one or more communications as high priority, in which case these recorded communications remain in storage after other lower priority communications are deleted to make room for new communications. The user may also select preferences for prioritizing communications. For example, the user may identify high priority conversations as those which include select participants or communications that contain specified keywords. The user may also identify conversations or communications with low priority (e.g., those including selected participants or containing specified keywords). Low priority communications may be stored in memory for shorter durations or may not be stored at all.

Logic may be encoded in one or more tangible media for execution by the processor 18. For example, the processor 18 may execute codes stored in a computer-readable medium such as memory 20. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 22 may comprise one or more interfaces (linecards, ports) for receiving signals or data or transmitting signals or data to other devices. The interface 22 may include, for example, an Ethernet interface for connection to a computer or network.

The network device 12 also includes a conversation module 26 operable to generate a conversation (e.g., audio/video recording) from two or more recorded audio communications representing different participants' portions of the conversation. As described in detail below with respect to FIG. 3, the conversation module 26 is configured to interact with the mobile device 10, tag/categorize received communications, store recorded communications, search a database of recorded communications, and generate a conversation from the recorded communications. The generated conversation may be an audio recreation of the original conversation, a video containing text corresponding to the recorded audio, or an animated video with audio.

The network device 12 may be configured, for example, to generate a transcription of the recorded audio communication. The transcription (e.g., computer generated transcription) may be used to identify keywords (e.g., for use in prioritizing or tagging the recorded communication as described below) or to provide text for display in a video, in which case audio is not needed for the generated conversation.

In another example, the generated conversation comprises video and audio. In one embodiment, the user may choose an avatar (e.g., from a group of preloaded graphical images) or create an avatar to represent the user. The user may also specify a preferred or default avatar to use to represent him in any generated video. The avatars may be configured such that their emotions, voices, or gestures differ based on the recorded communication. The avatars may also automatically lip-sync the recorded words. The user may also select from a variety of scenes for the video (e.g., cubicle, park, office, dinner table) and pick camera angles, sound effects, etc.

In one embodiment, the network device 12 is operable to configure security groups each containing a list of people that the user trusts enough to access the user's portion of the conversation. The trust group may include, for example, friends, family, co-workers, team members, employers, employees, etc. If a participant is in the user's trust group, the participant's portion of the conversation is included in the generated conversation. The conversation may include, for example, two or more of the participants' recorded communications, while leaving out one or more other participant's portion of the conversation if they are not included in the user's trust group or their portion of the conversation was not recorded. The system may also be configured to allow participants to exclude their portion of the conversation for a specified communication (e.g., date/time, participants).

It is to be understood that the network and network device 12 shown in FIG. 1 and described herein are only examples and that other networks and network devices having different components or configurations may be used, without departing from the scope of the embodiments. For example, the network device 12 may further include any suitable combination of hardware, software, algorithms, processors, devices, components, or elements operable to facilitate the capabilities described herein.

Figure 2:
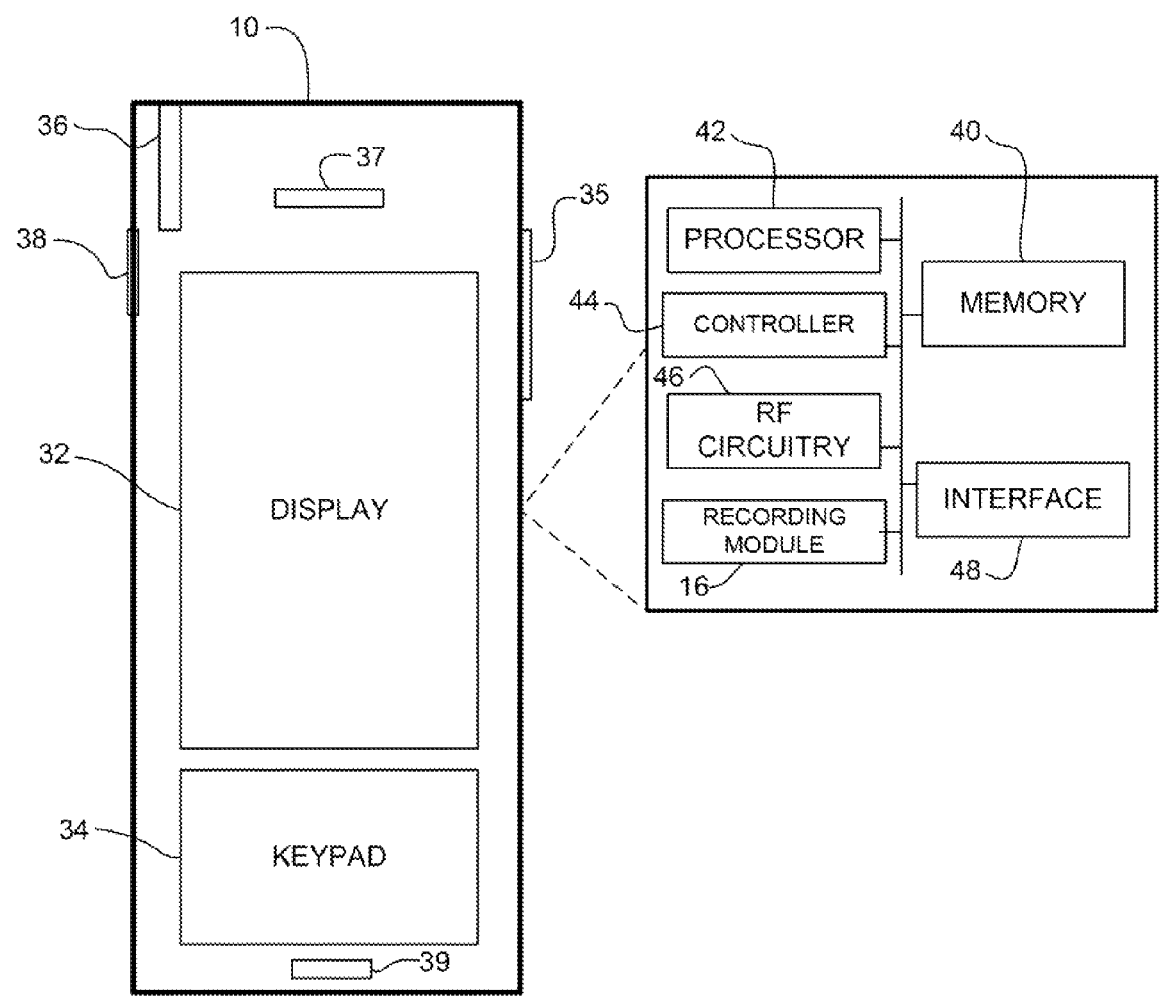
FIG. 2 depicts an example of a mobile device useful in implementing embodiments described herein.

FIG. 2 illustrates an example of the mobile device 10 in which embodiments described herein may be implemented. The mobile device 10 includes a visual display 32 and a keypad 34 comprising multiple keys (not shown) used in operation of the device. The screen 32 may be used to display a graphical user interface for use in entering user preferences (e.g., priorities, number of communications to store, time period to store communications) or other information (e.g., user identifier or password, trust group, mobile identifier). The screen 32 may also be used to display a video of the generated conversation. The keypad 34 may also be a touch screen integrated with the display 32. The keypad 34 may include numeric keys, alphabetic keys, standard telephone keys, or any other icons or symbols. The mobile device 10 may include any number of other user interfaces such as one or more manual buttons (e.g., switch 35).

A user can select and activate the recording module 16 by touching the display screen 32 (e.g., selecting an icon on the touch screen) or pressing one or more buttons. Once activated, the recording module 16 may record all communications at the mobile device 10 (e.g., calls initiated by user at the mobile device 10, incoming calls received at the mobile device, or user's conversations at the location of the mobile device). The mobile device 10 may also be configured so that a user can selectively initiate or turn off the recording module 16 using one or more user interfaces. For example, after the recording module 16 is activated, the user may be presented with an option such as "Press to start recording", or the recording may be automatically initiated at the start of each new communication. Once the recording module is active, another message may be displayed on the touch screen (e.g., "Press to stop recording").

In one embodiment, the recording module 16 (or other module or application at mobile device 10) may be configured for displaying a graphical user interface on the display screen 32 for use by the user in requesting a generated conversation from network device 12. For example, the graphical user interface may present the user with a list of available conversations (e.g., identified by date/time, participants, keywords) and options (e.g., participants to include, format (audio, video, audio and video), portion of conversation). The graphical user interface may also be used to enter search information for use in finding a conversation to recreate.

Referring again to FIG. 2, the mobile device 10 also includes an antenna 36, which may be internal or external to the device, for wireless communications. One or more external ports 38 may be provided for connection with another input or output device (e.g., external display or microphone). The mobile device 10 also includes a speaker 37 and microphone 39.

As illustrated in the block diagram of FIG. 2, the mobile device 10 further includes memory 40, one or more processors 42, mobile device controller 44, RF (Radio Frequency) circuitry 46, network interface 48, and recording module 16.

Memory 40, which may include one or more computer readable storage mediums, may be any form of volatile or nonvolatile memory, including for example, random access memory (RAM), read-only memory (ROM), magnetic media, optical media, flash memory, removable media, or any other suitable memory component. Memory 40 may store any data or information, including software and encoded logic, utilized by the mobile device 10. Memory 40 may also store the recorded communication before it is transmitted to the network device 12.

The one or more processors 42 run or execute various code, software programs, or instructions stored in memory 40 to perform functions for the mobile device 10 and to process data. Logic may be encoded in one or more tangible media for execution by the processor 42. For example, memory 40 can be utilized to store and retrieve software programs incorporating computer code that implements aspects of the embodiments, data for use with the embodiments, and the like. As described above, the processor may also be configured to encode/decode audio or video.

The RF circuitry 46 receives and transmits RF signals and converts electrical signals to or from electromagnetic signals and communicates with communication devices via the electromagnetic signals. Communication circuitry allows the mobile device 10 to communicate with other network devices using any suitable communications protocol.

The mobile device controller 44 provides for management and control of various elements within the device 10. For example, the controller 44 may access information maintained within memory 40 and control other elements to interact with users and other communication devices.

The network interface 48 may include one or more interfaces. The interfaces 48 may comprise, for example, a radio interface (e.g., 3G/4G radio interface) for communication via a base station or a Wi-Fi interface for communication with an access point.

It is to be understood that the mobile device 10 shown in FIG. 2 and described herein is only one example of a mobile device, and that the device may have additional, fewer, or different components, or a different arrangement or configuration of components, without departing from the scope of the embodiments. For example, the mobile device 10 may further include any suitable combination of hardware, software, algorithms, processors, devices, components, or elements operable to facilitate the capabilities described herein.

Figure 3:
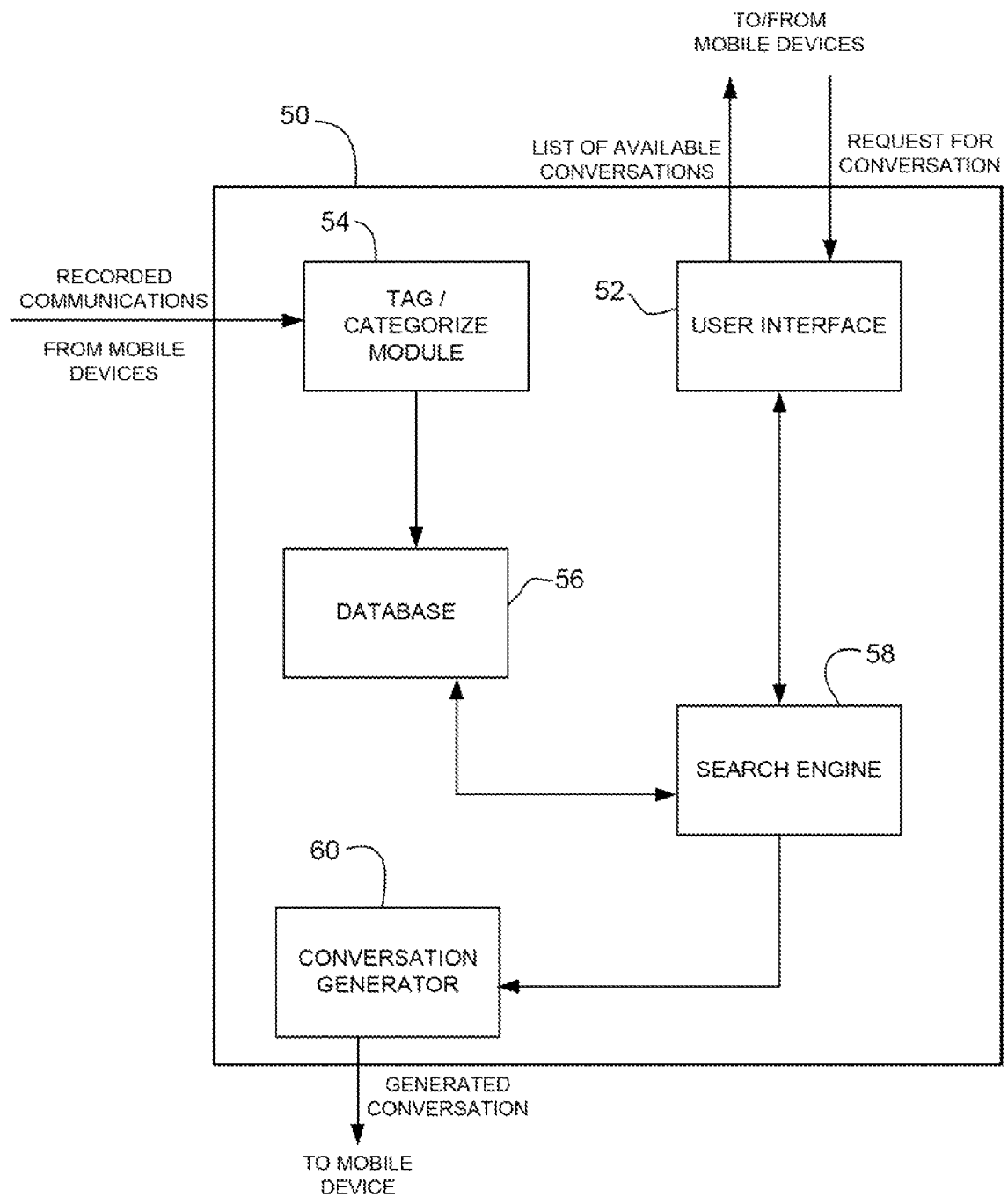
FIG. 3 is a block diagram of a system for storing recorded communications and recreating conversations, in accordance with one embodiment.

FIG. 3 is a block diagram illustrating components of a communication storage and conversation construction system 50, in accordance with one embodiment. In the example shown in FIG. 3, the system includes a user interface 52, tag/categorize module 54, database 56, search engine 58, and conversation generator 60. Recorded communications are received from the mobile devices 10 at the tag/categorize module 54. The communications may be categorized, for example, by user, date/time, participants, keywords, etc. In one embodiment, the tag/categorize module 54 is configured to translate the audio to text for use in identifying keywords in the communication. The module 54 transmits the tagged/categorized communications to the database 56 for storage.

The database 56 may also contain access control lists (e.g., trust groups) for use in identifying whether or not a specified user is allowed access to recorded communications from other participants.

The user interface 52 interacts with the mobile device 10 to receive requests for generated conversations. The user interface 52 may also receive information from the search engine 58 for use in generating a list of available conversations. The list may include, for example, conversations identified by date/time, participants, keywords, priority, etc.

The search engine 58 uses the information provided in a user request to search the database 56 for recorded communications which are part of the requested conversation. The search engine 58 is preferably configured to rapidly locate specific communications stored in database 56. The search engine 58 retrieves the recorded communications that are part of the requested conversation and for which the user is authorized to receive. For example, a conversation may comprise three recorded communications (from the user and two other participants), however, only one participant is in the same trust group as the user. In this case, the generated conversation will only include two of the recorded communications. The search engine 58 transmits the recorded communications to the conversation generator 60. The generator 60 stitches together the recorded communications in the requested format (e.g., audio, video, audio and video). The conversation generator 60 may use a time stamp or common audio signal in the recordings to properly align the communications. The conversation generator 60 may receive format information or other preferences from the user interface 52 for use in recreating the conversation.

Figure 4:
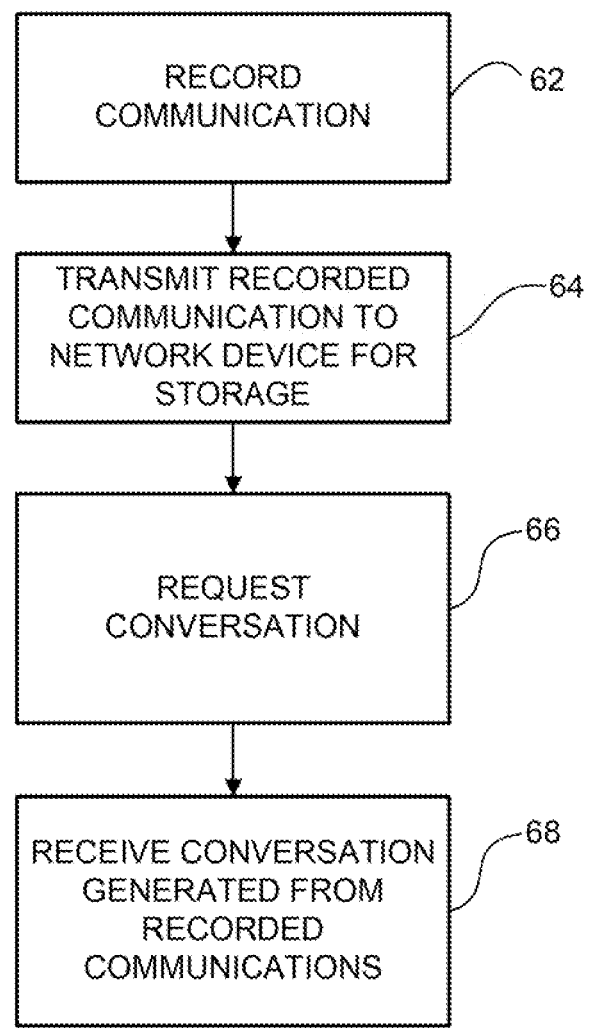
FIG. 4 is a flowchart illustrating an overview of a process at a mobile device for recording a communication and requesting a conversation recreated from individually recorded communications, in accordance with one embodiment.

FIG. 4 is a flowchart illustrating an overview of a process at the mobile device 10 for recording a communication and requesting a generated conversation, in accordance with one embodiment. At step 62, a communication is recorded at the mobile device 10 using recording module 16. In one example, the recording module 16 at the user's mobile device records the user's portion of the conversation, and another participant's portion of the conversation is recorded at their mobile device. The recorded communications from each mobile device 10 are transmitted to the network device 12 (step 64). The user may request a conversation by identifying a date and time, participants, keywords, etc., or selecting the conversation from a list of available conversations (step 66).

For example, the user may realize that a conversation he had on the previous day would be of interest to others on his team. The user may scroll through a list of his conversations and identify the one he wants (e.g., based on time of conversation or participants). The user may also request a format (e.g., audio, video, audio and video) for the generated conversation and select one or more options (e.g., specify avatars for use in the video). The user may also enter a name or password for a trust group in order to have access to recorded communications corresponding to the other participants' portions of the conversation. The network device 12 generates the requested conversation, as described below with respect to FIG. 5.

The mobile device 10 receives the generated conversation from the network device 12 (step 68). The generated conversation may be delivered, for example, via streaming video or file to the mobile device 10 or may be sent to a specified contact (e.g., user e-mail).

Figure 5:
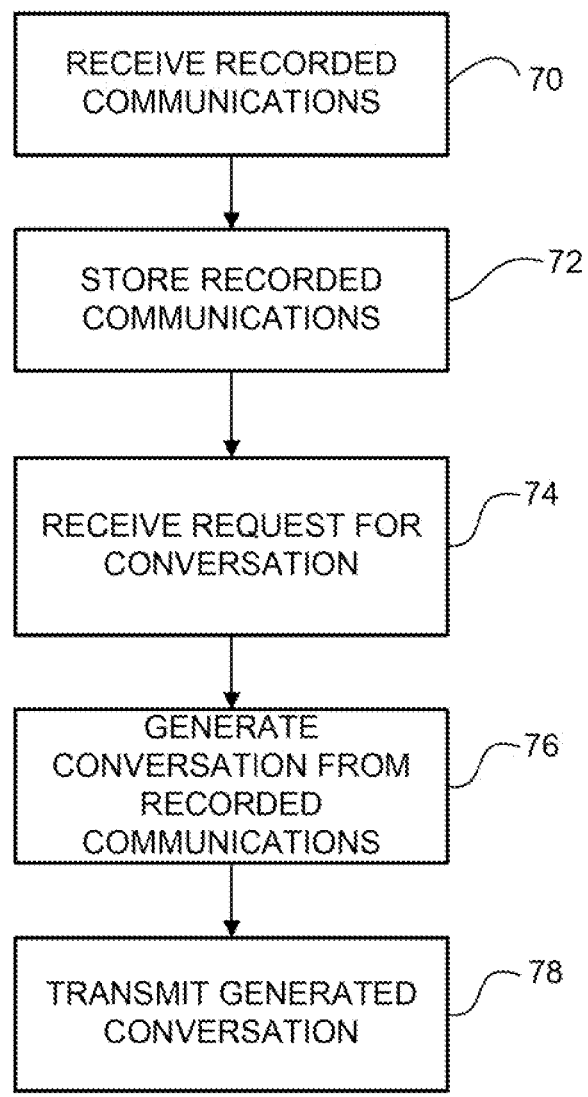
FIG. 5 is a flowchart illustrating an overview of a process at a network device for storing recorded communications and generating a recording of the conversation from the recorded communications, in accordance with one embodiment.

FIG. 5 is a flowchart illustrating an overview of a process at the network device 12 for storing recorded communications and generating a conversation (recording of the conversation) from the recorded communications, in accordance with one embodiment. At step 70, the network device 12 receives recorded communications from recording modules 16 at mobile devices 10. The network 12 device may tag or categorize the communications as previously described and stores the recorded communications (step 72). The recorded communication may be identified, for example, by the user (e.g., username, identifier, password), participants, date/time, keyword, or any combination thereof. The network device 12 may also generate a list of recorded communications and link related communications (i.e., recorded communications from same conversation). As previously described, the network device 12 may generate a list of the recorded communications or conversations for each user and transmit the list to the user's mobile device 10 for use in selecting a conversation.

The network device 12 receives a request for a conversation generated from two or more recorded communications (step 74). The request may identify, for example, the user and date/time of communication or may indicate a conversation selected from a list presented to the user on the mobile device 10. If the other participants in the conversation are in the same trust group as the user requesting the conversation, the network device 12 allows the user to include the other participants' recorded communications (portions of the conversation) in the generated conversation. The request may also specify one or more options for the conversation (e.g., format, graphical image to represent user, background, music, special effects). If no preferences are specified, stored user options or default options may be used.

The network device 12 generates the conversation from the recorded audio communications (step 76). The individually recorded communications are stitched together using, for example, time as a common indicator. The network device 12 transmits the generated conversation to the user requesting the conversation (step 78). As noted above, video may be transmitted, for example, as streaming video to the mobile device 10 associated with the user or a file (e.g., audio, video, audio and video) may be transmitted to the user's e-mail or mobile device.

It is to be understood that the processes illustrated in FIGS. 4 and 5 are only examples and that steps may be modified, added, removed, or combined, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    recording a first portion of a multiparty conversation at a mobile device, said first portion comprising a first participant's portion of the multiparty conversation;
    transmitting said first portion of the multiparty conversation to a network device;
    transmitting a request for the multiparty conversation to the network device; and
    receiving from the network device, a conversation generated from said first portion of the multiparty conversation and a second portion of the multiparty conversation comprising a second participant's portion of the multiparty conversation;
    wherein said first participant's portion of the multiparty conversation comprises a mobile device user's portion of the multiparty conversation, said second participant's portion of the multiparty conversation not included in said first portion of the multiparty conversation.

2. The method of claim 1 wherein recording said first portion of the multiparty conversation comprises automatically recording communications at the mobile device.

3. The method of claim 1 wherein the generated conversation comprises a video.

4. The method of claim 3 wherein the video comprises graphical images used to represent said participants in the generated conversation.

5. The method of claim 1 wherein the generated conversation comprises recorded portions of the multiparty conversation from all participants in the conversation belonging to a common trust group.

6. The method of claim 1 further comprising providing a list of available conversations.

7. The method of claim 1 wherein transmitting said request comprises transmitting a format for the generated conversation.

8. The method of claim 1 wherein the multiparty conversation is generated from said portions of the multiparty conversation recorded at different mobile devices.

9. A method comprising:
receiving and storing portions of a multiparty conversation at a network device, each of said portions of the multiparty conversation comprising a different participant's portion of the multiparty conversation;
receiving a request for the multiparty conversation at the network device;
generating a conversation from at least two of said portions of the multiparty conversation at the network device; and
transmitting the generated conversation.

10. The method of claim 9 wherein receiving the request comprises receiving the request from a mobile device associated with one of said participants of the multiparty conversation.

11. The method of claim 9 wherein the generated conversation comprises a video comprising images representing the participants.

12. The method of claim 9 wherein the generated conversation excludes at least one of said participant's portion of the multiparty conversation.

13. The method of claim 9 further comprising categorizing said portions of the multiparty conversation.

14. The method of claim 9 further comprising transcribing said portions of the multiparty conversation and identifying keywords for use in tagging the multiparty conversation.

15. The method of claim 9 further comprising generating a list of available conversations stored at the network device.

16. The method of claim 9 further comprising searching a database for said portions associated with the multiparty conversation after receiving said request for the multiparty conversation and including only said portions for said participants belonging to a common trust group.

17. Logic encoded on one or more non-transitory computer readable media for execution and when executed operable to:
store portions of a multiparty conversation, each of said portions of the multiparty conversation comprising a different participant's portion of the multiparty conversation;
process a request for the multiparty conversation;
generate a conversation from at least two of said portions of the multiparty conversation; and
transmit the generated conversation.

18. The logic of claim 17 wherein the generated conversation comprises a video comprising images representing the participants.

19. The logic of claim 18 wherein the images comprise avatars that change based on changes in the multiparty conversation.

20. The logic of claim 17 wherein the generated conversation comprises said portions from all of the participants in the conversation belonging to a common trust group.

\* \* \* \* \*